Nov. 7, 1950   E. A. EDWARDS   2,528,645
HYDRAULIC POWER TRANSMISSION APPARATUS
Filed June 22, 1945   2 Sheets-Sheet 2

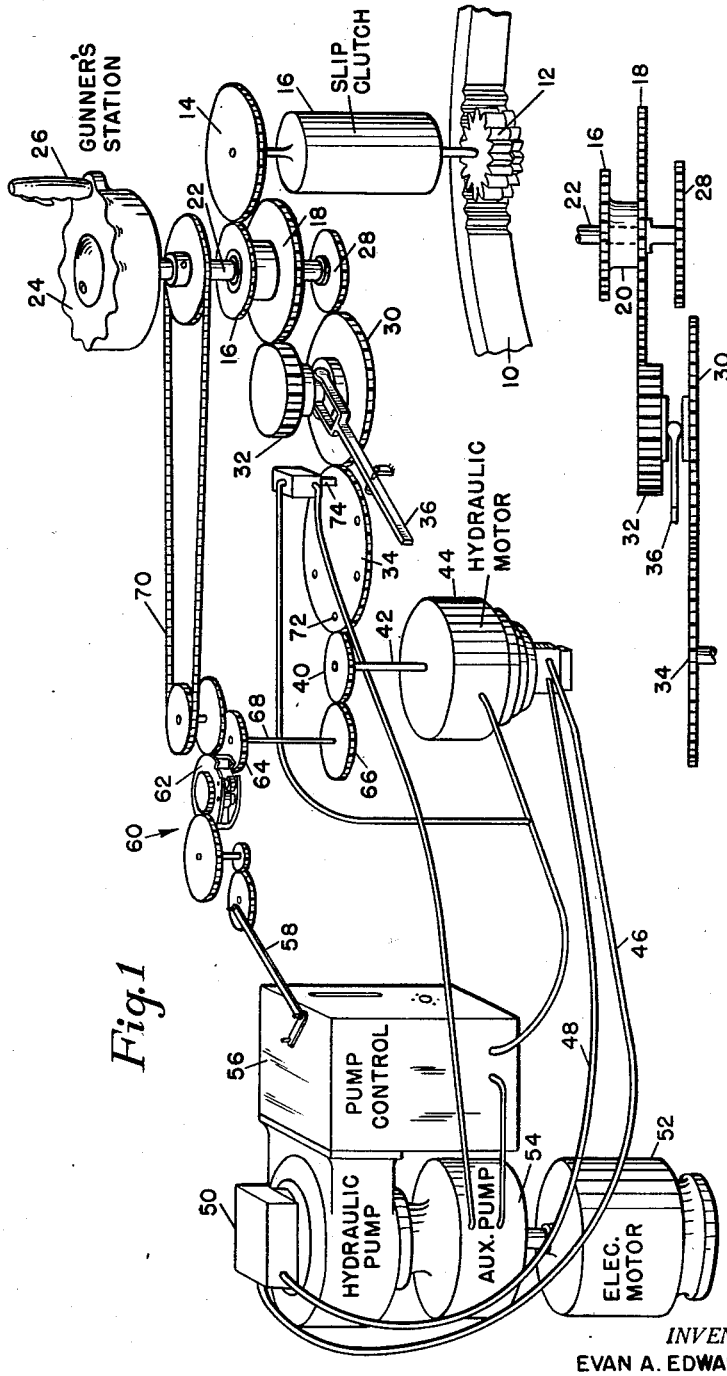

INVENTOR.
EVAN A. EDWARDS

Patented Nov. 7, 1950

2,528,645

UNITED STATES PATENT OFFICE 2,528,645

HYDRAULIC POWER TRANSMISSION APPARATUS

Evan A. Edwards, Cambridge, Mass., assignor to Massachusetts Institute of Technology, Cambridge, Mass.

Application June 22, 1945, Serial No. 600,949

4 Claims. (Cl. 60—53)

1

The invention described herein may be manufactured and used by or for the Government for governmental purposes, without the payment to me of any royalty thereon.

This invention relates to a locking device for securing moving parts of a power-operated mechanism from movement when the power which drives the mechanism fails. More particularly the invention relates to a locking device of this kind for use in the power transmission mechanism which connects a prime mover with a military tank turret for the rotation thereof.

In many military tanks the power transmission mechanism for the rotation of the turret may include a hydraulic transmission in which a pump is driven by the prime mover and is hydraulically connected to a motor which in turn is mechanically connected to the turret for the rotation thereof. Suitable control means are provided to control the operation of the pump so as to rotate the turret in either direction at any speed and to any angle desired. Since military tanks are often called upon to operate upon rough terrain which may cause them to tilt steeply and suddenly in any direction, the tank turret may often be subjected to external slewing stresses. In case of failure of the prime mover, it is desirable that the turret be locked to prevent uncontrolled slewing which otherwise might result from such stresses. According to the present invention, a locking device is provided which includes a locking element adapted to engage some member of the connecting mechanism between the hydraulic transmission system and the turret itself so as to lock the entire train against movement. The locking device is responsive to hydraulic pressure and is connected hydraulically to the power transmission system in such a way as to be maintained in its inactive position as long as pressure is maintained in the system. Upon failure of pressure in the system, the locking device moves into locking position and thus holds the turret stationary.

For a more complete understanding of the invention, reference may be had to the following description of an embodiment thereof, and to the drawings, of which:

Figure 1 is a schematic layout of a mechanism for operating a tank turret, including locking means embodying the invention.

Figure 2 is an elevation view of a portion of a gear train shown in Figure 1.

2

Figure 3:
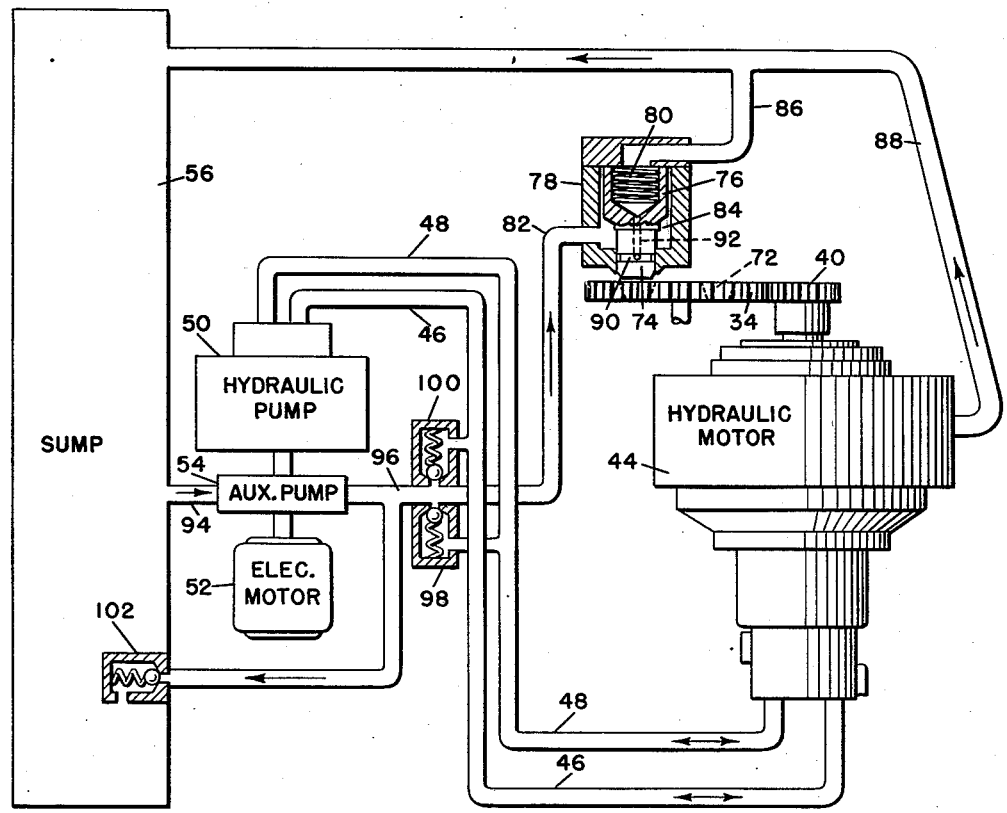
Figure 3 is a schematic illustration of the hydraulic portion of the apparatus shown in Figure 1.

In Figure 1, the turret itself is represented by a fragment of the bull gear 10 of the turret. This gear is driven by a pinion 12 which is connected to a gear wheel 14 through a frictional slip-clutch 16 of well known construction to prevent damage to the driving mechanism in case the turret becomes jammed. The gear wheel 14 meshes with a gear wheel 16 which rotates as a unit with a gear wheel 18, both being secured to a common hub 20. This unit rotates loosely about a shaft 22 upon which is mounted a handwheel 24 having a suitable handle 26 by which the entire apparatus may be controlled. At the lower end of the shaft 22 is mounted a gear wheel 28 which is connectable with a gear wheel 30. The latter rotates as a unit with a gear wheel 32 which is always in mesh with the gear wheel 18. Thus there is a continuous mechanical connection between the gear wheel 30 and the turret itself. As shown in Figure 2, the gear wheel 30 is normally engaged by a power-driven gear wheel 34 from which it can be shifted by a suitable lever 36 into engagement with the gear wheel 28. This lever 36 is arranged for manual operation by the gunner in the turret to enable him to employ at his option power means or manual effort for rotating the turret. The gear wheel 34 meshes with the pinion 40 which is mounted on the shaft 42 of a hydraulic motor 44. This motor is hydraulically connected by two pipe lines 46 and 48 to a variable displacement hydraulic pump 50. The pump is driven by a suitable prime mover such as an electric motor 52. This motor also drives an auxiliary pump 54. The hydraulic pump 50 and the motor 44 are the chief parts of the hydraulic transmission system by which power is transmitted from the prime mover to the gear train connecting it with the turret. The direction and rate of delivery from zero to maximum of pressure fluid from the pump 50 to the motor 44 determine the direction and rate of rotation from zero to maximum of the turret when it is being driven by power. For this purpose the displacement of the variable displacement pump 50 and the direction of flow of pressure fluid therefrom are controlled by suitable variable displacement pump control mechanism in a casing indicated at 56, the details of which mechanism are not pertinent to the present invention. The variable displacement pump control mechanism is operated through a linkage 58 and a gear train, generally indicated at 60, which includes a differential gear 62 one element of which is connected to the pinion 40 by gear wheels 64 and 66 on a common shaft 68. The latter connection provides for a feedback from the motor 44 to a servomechanism included in the pump control means in the casing 56. The gear train 60 is operatively connected to the shaft 22 of the handwheel 24 by any suitable means, a belt or chain being conventionally shown in Figure 1 to indicate such means, whereby rotation of hand wheel 24, acting through differential gear 62 of gear train 60 and through linkage 58, operates the variable displacement pump control mechanism 56 to provide desired displacement from zero to maximum of the variable displacement pump 50 and the desired direction of flow of pressure fluid therefrom.

In order to lock the apparatus automatically in case of power failure when the power mechanism is being used to control the angular position of the turret, the gear wheel 34 is provided with a suitable number of recesses or holes 72 any one of which is adapted to be entered by a locking plunger 74. Referring to Figure 3, the plunger 74 is shown as a projection of a piston 76 which is slidable in a cylinder 78. The plunger 74 projects through one end of the cylinder 78 and is movable into locking engagement in any of the holes 72 in the gear wheel 34, the holes and the tip of the plunger being preferably tapered or bevelled to facilitate such entry. The plunger is pressed toward locking engagement by a suitable spring 80 which is seated in a hole in the other end of the piston 76. Pressure fluid admitted from a pipe 82 enters a chamber 84 in the cylinder 78 in such a way as to press the piston 76 back against the spring 80 and to retract the plunger 74 from locking engagement with the wheel 34. The plunger is maintained in its inactive position as long as pressure is applied through the pipe 82. The piston 76 fits somewhat loosely in the cylinder 78 so that fluid in the chamber 84 can readily pass around the piston and into a drainpipe 86 when the pressure in the pipe 82 fails and permits the spring 80 to move the piston away from its seat which surrounds the outlet to the drainpipe 86. This drainpipe joins a drainpipe 88 leading from the hydraulic motor 44 to a suitable sump which may conveniently be in the casing 56. This drainpipe thus takes care of the leakage from the high-pressure chambers of the motor into its outer casing and also takes care of leakage around the piston 76 within the cylinder 78. In order to avoid loss of oil past the plunger 74, the portion of the plunger which is within the end wall cylinder 78 is provided with a peripheral groove 90 which communicates by a passage 92 to the cavity in the piston 76 from which oil has free access to the drainpipe 86. Thus oil leaking around the plunger 74 is returned to the drainpipe 86 before it can escape from the casing 78 past the plunger 74.

The primary purpose of the auxiliary pump 54 is to keep the hydraulic circuit, which comprises the pump 50, motor 44 and pipes 46 and 48, filled with oil. To this end the auxiliary pump draws fluid from the sump through a suction pipe 94 and discharges it into a delivery pipe 96 which is connected through suitable check valves 98 and 100 to the pipe lines 46 and 48 respectively. The discharge pipe 96 connects also with the pipe 82 so that pressure is thus maintained in the cylinder as long as the auxiliary pump is operating. The pressure in the delivery pipe 96 and its connections is regulated by a spring-loaded relief valve 102 connected to the pipe 96 and discharging into the sump. This valve may be adjusted to maintain in the pipe 96 pressure of any desired magnitude as for example, 150 lbs. per square inch. The strength of the spring 80 is preferably such that only a small fraction of this pressure in the chamber 84 is sufficient to hold the plunger 74 in its inactive position. In case of failure of the prime mover, the auxiliary pump stops when the main pump stops. This permits the spring 80 to thrust the locking element 74 into engagement with the wheel 34. When this element enters one of the holes 72, the entire gear train is thereupon locked against movement. When the causes for failure of the prime mover have been removed and it is desired to unlock the gear train by restoring plunger 74 to its inactive normal position, it will be evident from the foregoing description that it will be necessary only to shift gear wheel 30 into engagement with the gear wheel 28 by means of lever 36, rotate hand wheel 24 to a neutral position to provide zero displacement of the variable displacement pump 50 through pump control mechanism 56, and to start prime mover 52. In this position, no fluid under pressure will flow from variable displacement pump 50, but fluid under pressure will be supplied by auxiliary pump 54 to press piston 76 back against the spring 80 to retract the plunger 74 from locking engagement with the wheel 34 as above described. Until there is again a failure of pressure in the system, as by failure of the prime mover, plunger 74 will now remain in its normal inactive position, and by operation of lever 36 the gunner in the turret may again employ at his option power means or manual effort for rotating the turret, as above described.

I claim:

1. A driven member, a locking element adapted to engage said driven member and secure it against movement, spring means pressing said element toward locking engagement with said driven member, hydraulic pressure-responsive means for retracting said locking element against the pressure of said spring from locking engagement with said driven member, a hydraulic motor operatively connected to said driven member, a variable displacement pump for supplying fluid under pressure to operate said motor, mechanism for controlling the displacement of said pump, an auxiliary pump supplying fluid under pressure to said pressure-responsive means, and common driving means for said pumps.

2. Apparatus of the class described comprising a closed hydraulic circuit including a pump and hydraulic motor, means for controlling said pump to circulate liquid at a desired rate of flow through said circuit in either direction to drive said motor, a member operatively connected to said motor to be driven thereby, a locking device adapted to engage said driven member to lock the same against movement, hydraulic means responsive to fluid pressure to maintain said locking means in inoperative position, an auxiliary pump, a fluid connection between said hydraulic means and said auxiliary pump, and common driving means for said pumps.

3. In combination with mechanism for rotating a tank turret comprising a prime mover, a hydraulic power transmission system including a main pump and an auxiliary pump both driven by said prime mover, a hydraulic motor driven by said main pump for rotating said turret, means for controlling the rate of flow and direction of pressure fluid from said pump to said motor, and a gear train connecting said system to said turret; a locking element movable into locking engagement with a member of said gear train, means resiliently pressing said locking element toward its locking position, and hydraulic means connected with said auxiliary pump and responsive to pressure delivered thereby to maintain said locking element out of locking engagement with said member as long as said pressure exists.

4. In apparatus of the class described, a closed hydraulic circuit including a hydraulic motor, a main pump and an auxiliary pump, common driving means for said pumps, means for controlling said main pump to circulate liquid through said circuit in either direction at a desired rate of flow to drive said motor, a member operatively connected to said motor to be driven thereby, and a hydraulic lock mechanism comprising a cylinder, a piston slidable within said cylinder, a plunger projecting from said piston through one end of said cylinder and movable in locking engagement with said member, said plunger having a peripheral groove in the portion thereof where it passes through the end of said cylinder, spring means pressing said piston to project said plunger toward said locking engagement, an inlet in said cylinder adjacent said end thereof arranged to supply fluid pressure to said piston to retract said plunger, an outlet in said cylinder adjacent the other end thereof, a passage connecting said groove with said outlet to provide for drainage of pressure fluid leaking along said plunger, and a fluid connection between said auxiliary pump and said inlet and outlet.

EVAN A. EDWARDS.

REFERENCES CITED

The following references are of record in the file of this patent:

UNITED STATES PATENTS

| Number | Name | Date |
|---|---|---|
| 1,077,984 | Irwin | Nov. 11, 1913 |
| 1,296,303 | Manly | Mar. 4, 1919 |
| 1,875,096 | Miller | Aug. 30, 1932 |
| 2,211,406 | Cannon | Aug. 13, 1940 |
| 2,366,398 | Harrington | Jan. 2, 1945 |